US00RE44373E

(19) United States
(12) Reissued Patent
Hsieh et al.

(10) Patent Number: US RE44,373 E
(45) **Date of Reissued Patent: *Jul. 16, 2013**

(54) LIGHTING APPARATUS

(75) Inventors: Duan-Cheng Hsieh, Taipei (TW); Lee Schaak, Dix Hills, NY (US)

(73) Assignee: Adesso Inc., New York, NY (US)

( * ) Notice: This patent is subject to a terminal disclaimer.

(21) Appl. No.: 11/788,015

(22) Filed: Apr. 17, 2007

Related U.S. Patent Documents

Reissue of:
(64) Patent No.: 6,203,178
Issued: Mar. 20, 2001
Appl. No.: 09/343,486
Filed: Jun. 30, 1999

U.S. Applications:
(63) Continuation of application No. 10/365,627, filed on Feb. 12, 2003, now Pat. No. Re. 39,810, which is a continuation-in-part of application No. 09/012,362, filed on Jan. 23, 1998, now Pat. No. 5,980,071, and a continuation-in-part of application No. 09/042,212, filed on Mar. 13, 1998, now Pat. No. 6,004,012.

(51) Int. Cl.
*F21S 8/08* (2006.01)

(52) U.S. Cl.
USPC ..... 362/414; 362/431; 362/410; 362/353; 362/453; 362/441

(58) Field of Classification Search
USPC ..... 362/414, 431, 227, 318, 410, 353, 362/453, 441
See application file for complete search history.

(56) References Cited

U.S. PATENT DOCUMENTS

| | | | | |
|---|---|---|---|---|
| 1,484,978 | A | 2/1924 | Wheeler | |
| 2,914,661 | A | 11/1959 | Winkler | |
| 4,118,764 | A | 10/1978 | Bleiweiss et al. | |
| 4,300,190 | A | 11/1981 | Mershon | |
| 4,356,540 | A | 10/1982 | Goralnik | |
| 4,956,758 | A | 9/1990 | Aubrey et al. | |
| 5,174,648 | A | 12/1992 | Clary et al. | |
| 5,826,975 | A | 10/1998 | Hsieh et al. | |
| 5,980,071 | A * | 11/1999 | Hsieh | 362/457 |
| 6,004,012 | A * | 12/1999 | Hsieh | 362/454 |

* cited by examiner

*Primary Examiner* — Ali Alavi
(74) *Attorney, Agent, or Firm* — Leason Ellis LLP

(57) ABSTRACT

A lighting apparatus includes a support member, a lighting unit mounted on one end of the support member, and a lamp shade mounted on the lighting unit. The lighting unit includes a containment member having a mounting portion mounted on the support member, a flared wall portion extending from a periphery of the mounting portion in a first direction away from the support member, and a partition plate disposed inside the flared wall portion in a second direction transverse to the first direction so as to define a closed accommodating space and an open accommodating space on two sides of the partition plate. The partition plate is formed with a cord hole. A socket member is disposed in the open accommodating space for mounting a light bulb thereon. An insulated conductive cord member has a first end portion connected electrically to the socket member, and a second end portion that extends into the closed accommodating space via the cord hole in the partition plate. A power cord member has a first connecting end to be connected electrically with a power supply, and a second connecting end that extends into the closed accommodating space and that is connected electrically to the second end portion of the insulated conductive cord member.

6 Claims, 7 Drawing Sheets

(AMENDED)

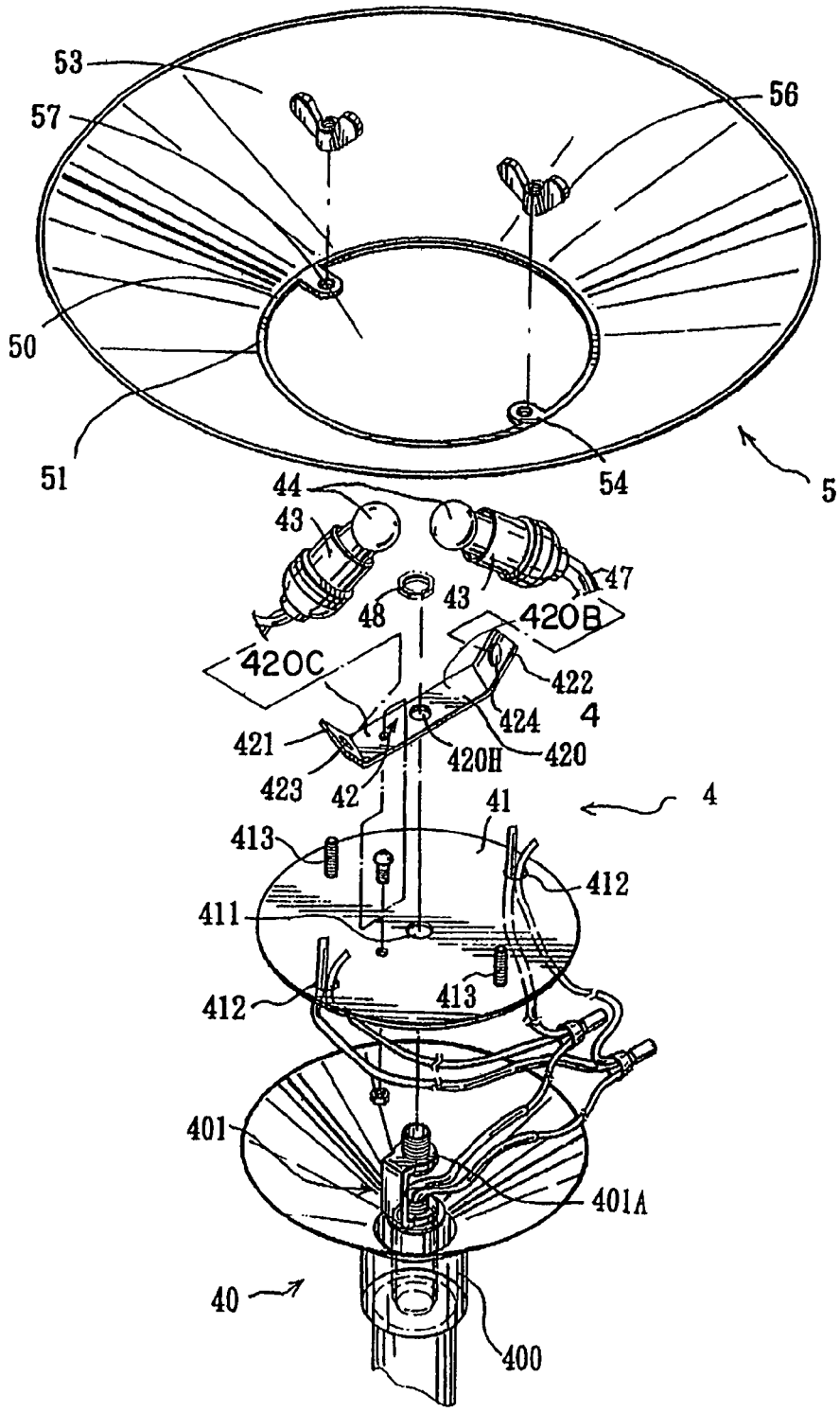
F I G. 3
(AMENDED)

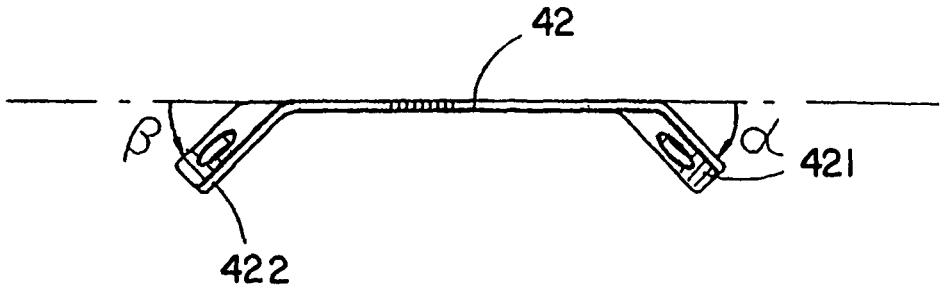
FIG. 6
(NEW)
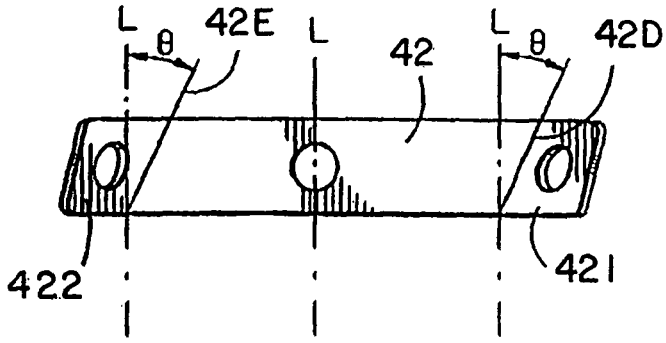
FIG. 7
(NEW)

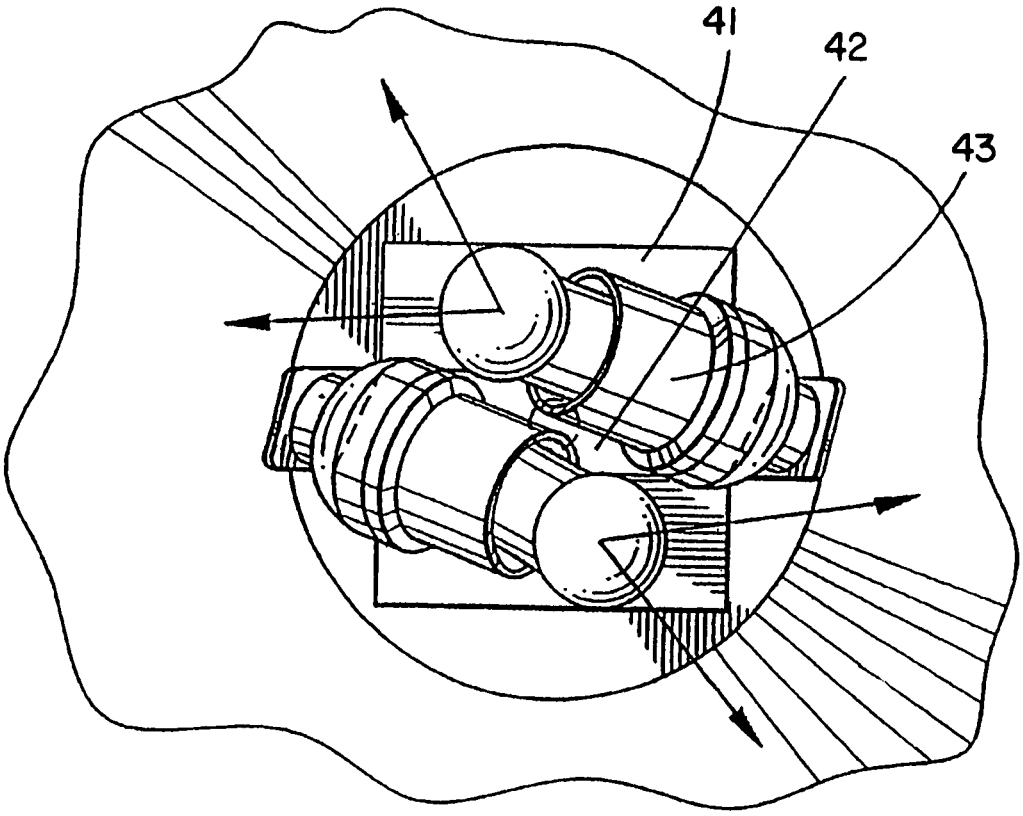
FIG. 8
(NEW)

LIGHTING APPARATUS

Matter enclosed in heavy brackets [ ] appears in the original patent but forms no part of this reissue specification; matter printed in italics indicates the additions made by reissue.

*RELATED APPLICATIONS*

*More than one reissue application has been filed for the reissue of U.S. Pat. No. 6,203,178. The present application is a continuation reissue application of U.S. Reissue patent application Ser. No. 10/365,627, filed on Feb. 12, 2003, entitled "LIGHTING APPARATUS" (reissue of U.S. Pat. No. 6,203,178 and now issued as Reissued U.S. Pat. No. Re. 39,810); which is a continuation-in-part, relates to, and claims priority from U.S. patent Ser. No. 09/012,362, filed on Jan. 23, 1998, entitled "LIGHTING FITTING," now U.S. Pat. No. 5,980,071, issued on Nov. 9, 1999, and U.S. patent Ser. No. 09/042,212, filed on Mar. 13, 1998, entitled "LIGHTING FITTING," now U.S. Pat. No. 6,004,012, issued on Dec. 21, 1999.*

FIELD OF THE INVENTION

The invention relates to a lighting apparatus, more particularly to a lighting apparatus which has conductive cord members concealed within a closed accommodating space so as to provide safety when in use and which includes a lamp shade detachable therefrom such that a plurality of the lamp shades can be stacked one over another to facilitate storage and transport of the same.

DESCRIPTION OF THE RELATED ART

Referring to FIG. 1, a conventional lighting apparatus 1 includes a support member 11, a lighting unit 14 mounted on the support member 11, and a lamp shade 15 mounted on the lighting unit 14.

As illustrated, the support member 11 includes a lamp base 10 and an upright post 110 having a lower end mounted on the lamp base 10 and an upper end supporting the lighting unit 14 thereon. The upright post 110 defines an axially extending cord passage therethrough. The lighting unit 14 includes a socket member 12 fixed on the upper end of the upright post 110 to receive a light bulb therein, and an insulated cord member 13 disposed in the cord passage. The insulated cord member 13 has one end connected electrically to the light bulb via the socket member 12, and a second end adapted to be connected electrically to a power supply. The lamp shade 15 includes a top portion 151, a skirt portion 152 extending downwardly and divergently from the periphery of the top portion 151, and a retention member 150 extending downwardly from the top portion 151 and mounted on the upper end of the post 110 around the socket member 12 so as to shield the light bulb.

Some of the disadvantages that result from the use of the conventional lighting apparatus are as follows:

(1) There is only one socket member 12 in the conventional lighting apparatus for receiving a light bulb, such as an incandescent lamp. The light bulb accordingly provides a poor lighting effect. In case a halogen lamp is used, a better lighting effect can be achieved. However, the halogen lamp will raise the ambient temperature of the conventional lighting apparatus.

(2) The conventional lighting apparatus is bulky and therefore occupies a relatively large amount of space during storage and transport. Even though the lamp shade 15 can be detached relative to the upright post 110, the lamp shades 15 of several conventional lighting apparatus cannot be stacked one over another due to the presence of the retention members 150.

In a co-pending U.S. application, entitled "LIGHT FITTING FOR AN INCANDESCENT LIGHTING ARRANGEMENT", filed on Jan. 23, 1998 by the applicant, there is disclosed a light fitting including a lampshade body, a mounting bracket, a pair of socket members, a pair of insulated conductive cord members, a containment member, a pair of incandescent bulbs, and a power cord member.

In another co-pending U.S. patent application Ser. No. 09/042,212, entitled "LIGHT FITTING FOR AN INCANDESCENT LIGHTING ARRANGEMENT", filed on Mar. 13, 1998 by the applicant, there is disclosed a light fitting including a containment member, a mounting bracket, a pair of socket members, and a lampshade body.

SUMMARY OF THE INVENTION

The object of this invention is to provide a lighting apparatus which includes a pair of light bulbs that can provide a lighting effect comparable to that of a halogen lamp with the same wattage as the light bulbs, and a lamp shade that can be easily detached from a containment member such that a plurality of the lamp shades can be stacked one over another to facilitate storage and transport of the same.

Another object of the present invention is to provide a lighting apparatus which has cord members concealed within a closed accommodating space of the lighting apparatus such that accidental touching thereof can be avoided.

Accordingly, the lighting apparatus of the present invention includes a support member, a lighting unit mounted on one end of the support member, and a lamp shade mounted on the lighting unit. The lighting unit includes a containment member having a mounting portion mounted on the support member, a flared wall portion extending from a periphery of the mounting portion in a first direction away from the support member, and a partition plate disposed inside the flared wall portion in a second direction transverse to the first direction so as to define a closed accommodating space on one side of the partition plate proximate to the mounting portion, and an open accommodating space on the other side of the partition plate. The partition plate has a center portion and a pair of cord holes offset from the center portion. A mounting bracket is disposed in the open accommodating space of the containment member, and includes an elongated middle portion mounted on the center portion of the partition plate, and first and second end portions disposed at opposite sides of the middle portion and bent respectively relative to the middle portion so as to form first and second anchoring surfaces, respectively. A pair of socket members are retained respectively on the first and second anchoring surfaces of the mounting bracket and are adapted for mounting a respective light bulb thereon. Each of a pair of insulated conductive cord members has a first end portion connected electrically to a respective one of the socket members, and a second end portion that extends into the closed accommodating space via a respective one of the cord holes in the partition plate. A power cord member has a first connecting end adapted to be connected electrically with a power supply, and a second connecting end that extends into the closed accommodating space and that is connected electrically to the second end portions of the insulated conductive cord members.

*The mounting bracket of the lighting apparatus of the present invention also can include an elongate middle portion that defines a mounting area for being secured to the anchoring area. The elongate middle portion has a bottom surface, a top wide surface, and first and second end portions which are disposed at opposite sides of the middle portion. The first and second end portions are bent, respectively, to an acute angle relative to and towards the bottom (wide) surface of the middle portion along two parallel lines which incline with a predetermined angle relative to a perpendicular line that crosses a longitudinal direction of the middle portion so as to form first and second anchoring surfaces, respectively.*

Preferably, the lamp shade has one end extending into the open accommodating space of the containment member and mounted detachably on the partition plate. A skirt portion of the lamp shade extends outwardly from the open accommodating space. After being detached from the containment members, a plurality of the lamp shades can be stacked one over another to facilitate storage and transport of the same.

BRIEF DESCRIPTION OF THE DRAWINGS

Other features and advantages of this invention will become more apparent in the following detailed description of the preferred embodiment of this invention, with reference to the accompanying drawings, in which:

FIG. 3 is an exploded view of the preferred embodiment, wherein a support member is not illustrated for the sake of clarity;

*FIGS. 6 and 7 illustrate two different views of a bracket member in accordance with the invention; and*

*FIG. 8 is a fragmentary view of an embodiment of the invention, illustrating the lighting arrangement of the incandescent bulbs.*

DETAILED DESCRIPTION OF THE PREFERRED EMBODIMENT

Figure 1:
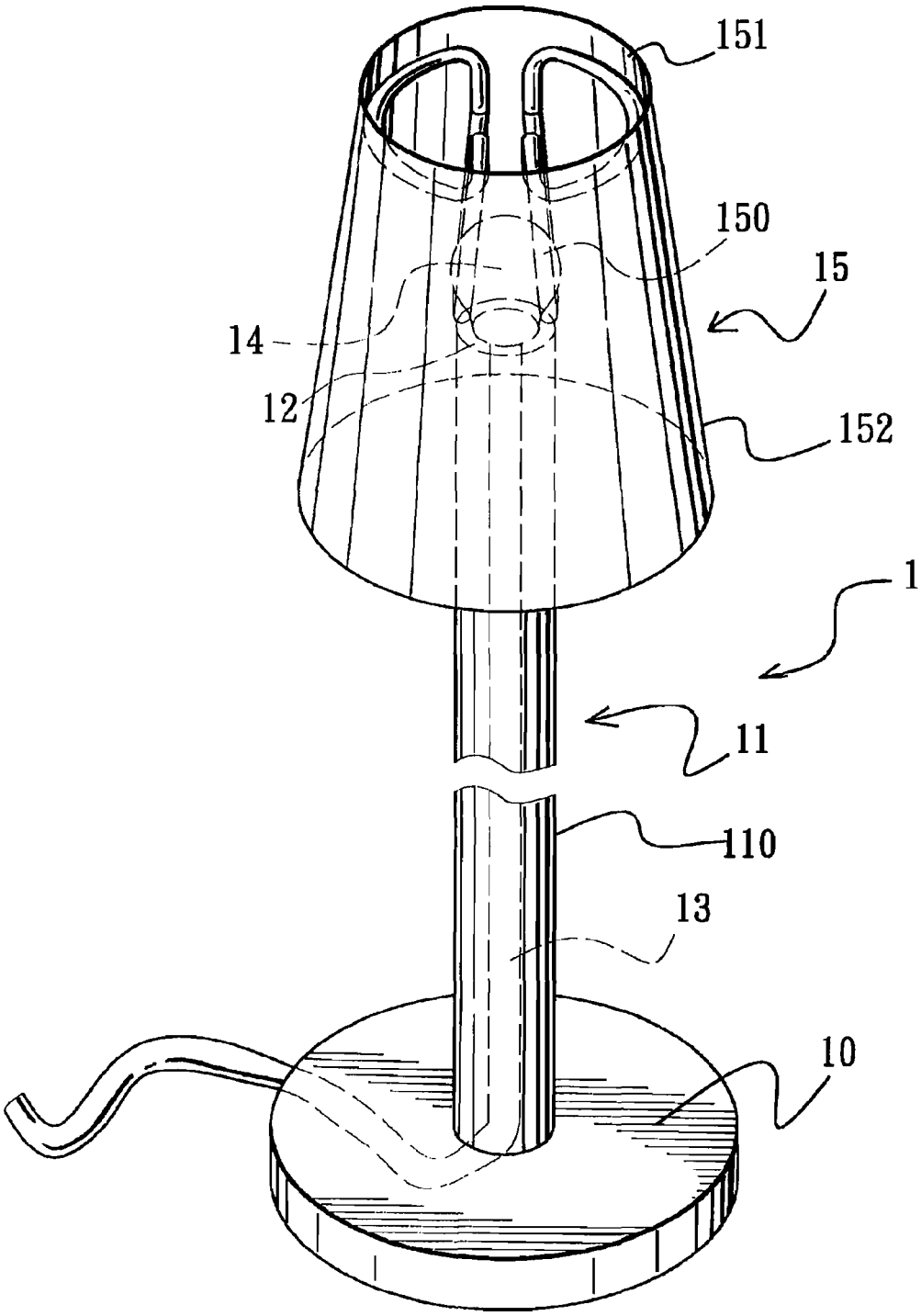
F I G. 1 PRIOR ART
FIG. 1 is a perspective view of a conventional lighting apparatus.
Figure 2:
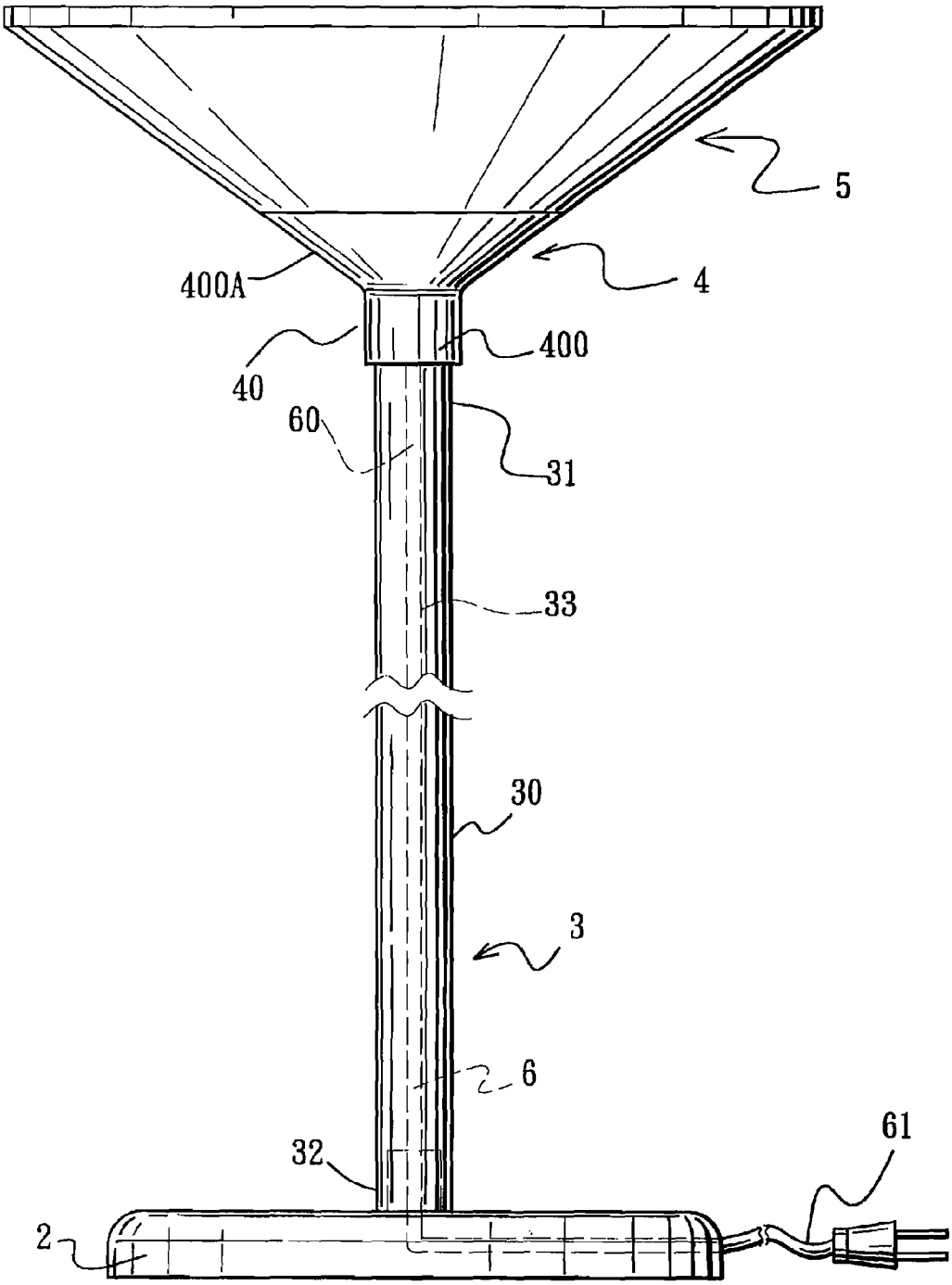
FIG. 2 is a schematic view of the preferred embodiment of a lighting apparatus of the present invention.
Figure 4:
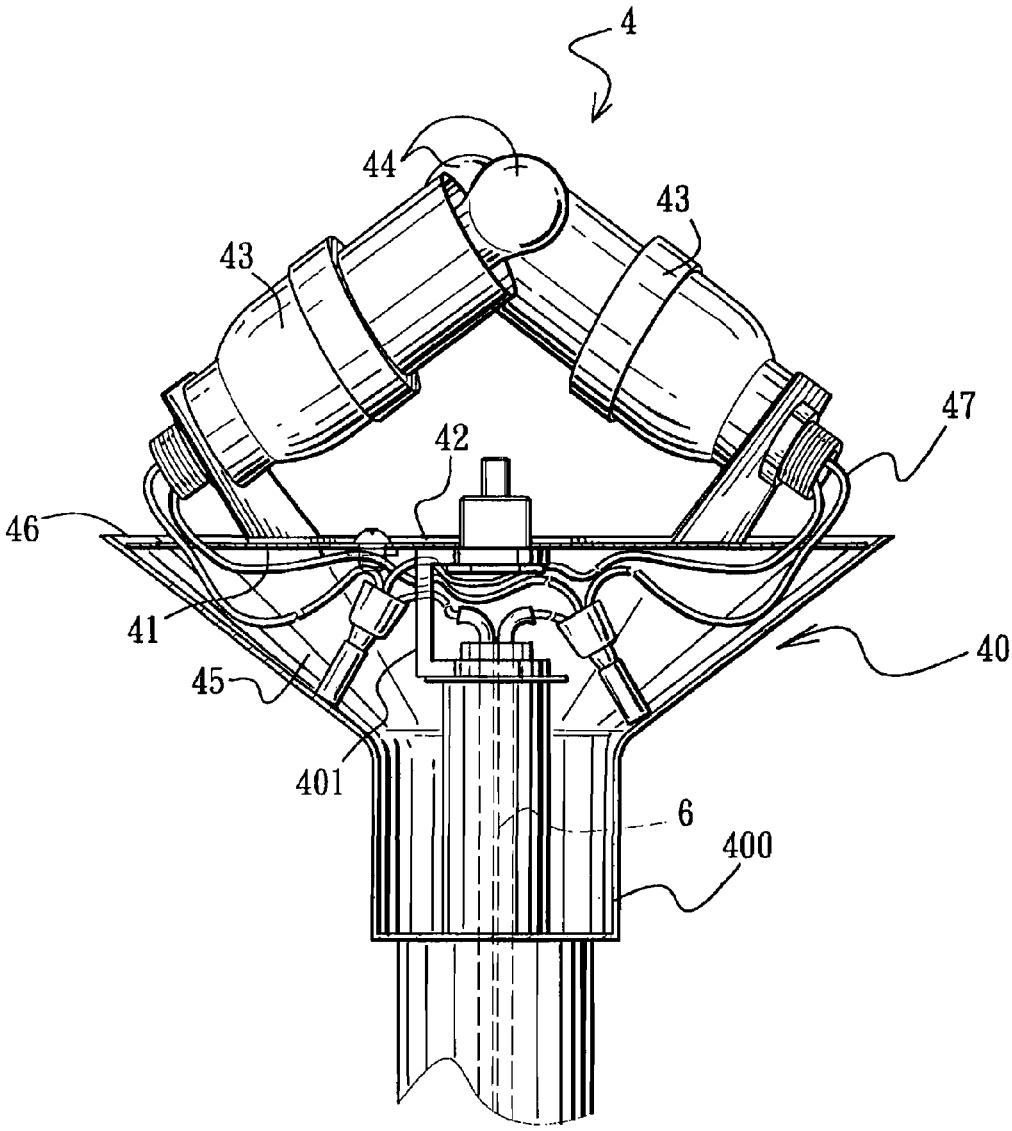
FIG. 4 is a partly sectional view of the preferred embodiment, illustrating an interior thereof; [and]

Referring to FIGS. 2, 3 and 4, the preferred embodiment of the lighting apparatus of this invention is shown to be embodied in a stand lamp that includes a support member 3, a lighting unit 4 mounted on the support member 3, and a lamp shade 5 mounted on the lighting unit 4. The lighting unit 4 includes a containment member 40, a mounting bracket 42, a pair of socket members 43, a pair of insulated conductive cord members 47, and a power cord member 6.

As illustrated, the containment member 40 has a mounting portion 400 mounted on the support member 3, a flared wall portion 400A extending from a periphery of the mounting portion 400 in a first direction away from the support member 3, and a partition plate 41 disposed inside the flared wall portion 400A in a second direction transverse to the first direction so as to define a closed accommodating space 45 on one side of the partition plate 41 proximate to the mounting portion 400, and an open accommodating space 46 on the other side of the partition plate 41. The partition plate 41 has a center portion 411 and a pair of cord holes 412 offset from the center portion 411.

The mounting bracket 42 is disposed in the open accommodating space 46 of the containment member 40, and includes an elongated middle portion 420 mounted on the center portion 411 of the partition plate 41, and first and second end portions 412,422 disposed at opposite sides of the middle portion 420. The first and second end portions 412, 422 are bent respectively relative to the middle portion 420 so as to form first and second anchoring surfaces 423,424, respectively. Two passage holes are formed respectively through the anchoring surfaces 423,424 of the mounting bracket 42.

*In certain embodiments the mounting bracket 42, which is disposed in the open accommodating space 46 of the containment member 40, includes an elongated middle portion 420 that defines a mounting area for being secured on the center portion 411 of the partition plate 41. The middle portion in an embodiment so-constructed has a bottom wide surface 420C, a top wide surface 420B, a first end portion 421 and a second end portion 422 that are disposed at opposite sides of the middle portion 420. The first end portion 421 and the second end portion 422 are bent, respectively, to an acute angle relative to and towards the bottom wide surface 420C of the middle portion 420 along two parallel lines which incline with a predetermined angle relative to a perpendicular line that crosses a longitudinal direction of the middle portion 420 so as to form first and second anchoring surfaces 423,424, respectively.*

The socket members 43 are retained respectively on the first and second anchoring surfaces 423, 424 of the mounting bracket 42, and are adapted for mounting a respective light bulb 44, such as an incandescent lamp, thereon.

Each of the insulated conductive cord members 47 has a first end portion connected electrically to a respective one of the socket members 43 via a respective one of the passage holes in the anchoring surfaces 423, 424, and a second end portion extending into the closed accommodating space 45 via a respective one of the cord holes 412 in the partition plate 41.

The power cord member 60 has a first connecting end 61 adapted to be connected electrically to a power source (not shown), and a second connecting end 60 extending into the closed accommodating space 45 of the containment member 40 and connected electrically to the second end portions of the insulated conductive cord members 47.

In the preferred embodiment, the mounting portion 400 of the containment member 40 is formed with a mounting post 401 that projects into the closed accommodating space 45 and that has the center portion 411 of the partition plate 41 and the middle portion 420 of the mounting bracket 42 mounted thereon. The lamp shade 5 has one end 51 extending into the open accommodating space 46 of the containment member 40, and is mounted detachably on the partition plate 41. The partition plate 41 further has a pair of screw posts 413 that extend into the open accommodating space 46 of the containment member 40. The lamp shade 5 has a skirt portion 53 with a mounting side 50 that extends into the open accommodating space 46, and that is formed with two fastening lugs 54 for mounting on the screw posts 413 of the partition plate 41 such that the skirt portion 53 diverges in a direction away from the partition plate 41.

Preferably, the support member 3 includes a lamp base 2 and an upright lamp post 30 that has a lower end 32 mounted on the lamp base 2 and an upper end 31 with the mounting portion 400 of the containment member 40 mounted thereon. The lamp post 30 is formed with an axially extending cord passage for extension of the first connecting end 60 of the power cord member 6.

The mounting post 401 is preferably formed with an external thread such that the mounting post 401 can extend through the center portion 411 of the partition plate 41, and a through hole 42H in the middle portion 420 of the mounting bracket 42. An internally and externally threaded first locking nut 48 is mounted on the mounting post 401, and has an outwardly and radially extending abutment flange 480 to abut against the mounting bracket 42 around the hole 420H thereof in order to retain the mounting bracket 42 as well as the partition plate 41 in the containment member 40. A second locking nut 49 is threaded on the first nut 48 to enhance positioning of the mounting bracket 42 on the partition plate 41 such that once the mounting bracket 42 is installed in the open accommodating space 46, the mounting bracket 42 is exposed outwardly of the opening 57 (see FIG. 2) in the mounting side 50 of the lamp shade 5. Due to the inclined arrangement of the first and second anchoring surfaces 423,424 relative to the middle portion 420 of the mounting bracket 42, the light bulbs 44 mounted thereon cooperatively provide a lighting effect comparable to a halogen lamp which has the same wattage as that of the light bulbs 44.

Another aspect to note is that, the insulated conductive cord member 47 and the power cord member 60 are concealed in the closed accommodating space 46 of the containment member 40. As such, accidental touching of the cord members 47, 60 is consequently avoided to provide safety for the user of the lighting apparatus of the present invention.

*With further reference to FIGS. 6 and 7, it can be appreciated that the mounting bracket 42 includes a middle portion 420 that mounts to the top of the lamp and is flanked by end portions 421,422 that anchor light sockets. In order to prevent the bulbs from clashing with one another, the end portions 421,422 are bent upwardly from the top of the lamp at an angle such that the light sockets (and any bulbs seated therein) project from the top of the lamp at an acute angle* ($\alpha$, $\beta$). *In addition, the end portions 421,422 are bent along lines which locate the light sockets so that light bulbs seated in the respective sockets pass one another without contact. In the embodiment of FIGS. 3 and 4, the mounting bracket 42 has end portions 421,422 bent at an unspecified angle. In the embodiment of FIG. 7, the end portions 421,422 are bent along parallel lines at an angle* $\theta$ *relative to a line L that is perpendicular to the direction of elongation of the mounting bracket. In certain preferred embodiments, the acute angle* ($\alpha$, $\beta$) *ranges between 38 to 52 degrees, while the predetermined angle ranges between 16 to 26 degrees.*

Figure 5:
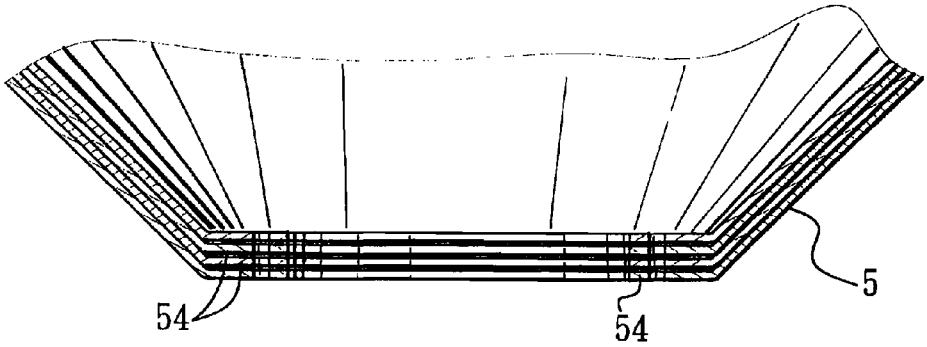
FIG. 5 illustrates how a plurality of lamp shades employed in a plurality of the preferred embodiments can be stacked one over another for storage and transport[.]

As best shown in FIG. 5, a plurality of the lamp shades 5 can be stacked one over another after detachment from the corresponding containment members 40 in order to facilitate the storage and transport of the same.

With the present invention thus explained, it is apparent that numerous modifications and variations can be made without departing from the scope and spirit of this invention. It is therefore intended that this invention be limited only as indicated in the appended claims.

We claim:

[1. A lighting apparatus including a support member, a lighting unit mounted on one end of said support member, and a lamp shade mounted on said lighting unit, wherein said lighting unit comprises:

a containment member having a mounting portion mounted on said one end of said support member, a flared wall portion extending from a periphery of said mounting portion in a first direction away from said support member, and a partition plate disposed inside said flared wall portion in a second direction transverse to the first direction so as to define a closed accommodating space on one side of said partition plate proximate to said mounting portion, and an open accommodating space on the other side of said partition plate, said partition plate having a center portion and a pair of cord holes offset from said center portion;

a mounting bracket disposed in said open accommodating space and including an elongated middle portion mounted on said center portion of said partition plate, and first and second end portions disposed at opposite side of said middle portion and bent respectively relative to said middle portion so as to form first and second anchoring surfaces, respectively;

a pair of socket members retained respectively on said first and second anchoring surfaces and adapted for mounting a respective light bulb thereon;

a pair of insulated conductive cord members, each having a first end portion connected electrically to a respective one of said socket members, and a second end portion extending into said closed accommodating space via a respective one of said cord holes; and a power cord member having a first connecting end adapted to be connected electrically to a power source, and a second connecting end extending into said closed accommodating space and connected electrically to said second end portions of said insulated conductive cord members.]

[2. The lighting apparatus as defined in claim 1, wherein said mounting portion of said containment member is formed with a mounting post that projects into said closed accommodating space and that has said center portion of said partition plate and said middle portion of said mounting bracket mounted thereon.]

[3. The lighting apparatus as claimed in claim 1, wherein said lamp shade has one end extending into said open accommodating space and mounted on said partition plate.]

[4. The lighting apparatus as claimed in claim 1, wherein said partition plate has a screw post unit that extends into said open accommodating space, and said lamp shade has a skirt portion with a mounting side that extends into said open accommodating space, and that is formed with a fastening lug unit for mounting on said screw post unit of said partition plate, said skirt portion diverging in a direction away from said partition plate.]

[5. The lighting apparatus as claimed in claim 1, wherein said support member includes a lamp base and an upright lamp post having a lower end mounted on said lamp base and an upper end with said mounting portion of said containment member mounted thereon, said lamp post being formed with an axially extending cord passage for extension of said first connecting end of said power cord member therethrough.]

*6. A light fitting for a lighting arrangement having a pair of light bulbs comprising:*

*a containment member, comprising:*

*an upper body having a bottom wall provided with a center portion at a first center thereof and formed with a communicating hole; and*

*a wall portion extending from a periphery confining said bottom wall;*

*a power cord member led through said communicating hole and into said wall portion to form a first contact terminal;*

*a mounting bracket including an elongated middle portion that defines a mounting area for securement to said center portion and that has a bottom wide surface and a top wide surface, and first and second end portions disposed at opposite sides of said middle portion; said first and second end portions being bent, respectively, to*

*an acute angle relative to and towards said bottom wide surface of said middle portion along two parallel lines which incline at a predetermined angle relative to a perpendicular line crossing a longitudinal direction of said middle portion so as to form first and second anchoring surfaces, respectively;*

*a pair of socket members adapted to receive the light bulbs;*

*a pair of insulated conductive cord members, each having one end portion connected conductively to a respective one of said socket members, and another end portion led to form a second contact terminal coupled to said first contact terminal; and*

*a lampshade having an upper wall with a second center, a skirt portion, and a through opening to permit said mounting bracket to extend downwardly and outwardly of said upper wall and into said wall portion, and to permit alignment of said mounting area of said mounting bracket with said second center when said upper wall of said lampshade body is mounted to the light fitting.*

*7. The light fitting of claim 6, wherein said acute angle ranges between 38 to 52 degrees.*

*8. The light fitting of claim 6, wherein said predetermined angle ranges between 26 and 36 degrees.*

*9. A lighting fixture for a lighting arrangement having a pair of light bulbs spaced from an open-accommodating space, comprising:*

*a containment member having a communicating hole;*

*a power cord extending through said communicating hole;*

*a mounting bracket supported by the containment member and including an elongated middle portion, and first and second end portions disposed at opposite sides of said middle portion, said first and second end portions being respectively bent to an acute angle relative to and towards said middle portion along two parallel lines which incline at a predetermined angle relative to a perpendicular line crossing a longitudinal direction of said middle portion so as to form first and second anchoring surfaces at said first and second end portions, respectively;*

*a pair of socket members respectively mounted on said first and second anchoring surfaces, adapted to receive the light bulbs, and electrically connected to said power cord; and*

*a lampshade supported by the containment member, said lampshade having an opening,*

*wherein said mounting bracket is disposed in the open-accommodating space.*

*10. The lighting fixture of claim 9, wherein said acute angle ranges between 38 to 52 degrees.*

*11. The lighting fixture of claim 9, wherein said predetermined angle ranges between 26 and 36 degrees.*

* * * * *